United States Patent

Matthiesen

[15] 3,634,909
[45] Jan. 18, 1972

[54] SHRIMP-PEELING MACHINE

[72] Inventor: Erik Hedeager Matthiesen, Langemoseuej 26, 2880 Bagsvaerd, Denmark

[22] Filed: July 22, 1969

[21] Appl. No.: 843,705

[30] Foreign Application Priority Data

Aug. 6, 1968 Denmark .......................... 3790/68
Feb. 19, 1969 Denmark .......................... 929/69

[52] U.S. Cl. .................................................. 17/73
[51] Int. Cl. .................................................. A22c 29/00
[58] Field of Search .................... 17/71, 72, 73, 53, 54, 48

[56] References Cited

UNITED STATES PATENTS

| | | | |
|---|---|---|---|
| 2,663,897 | 12/1953 | Greiner et al. | 17/71 |
| 3,020,583 | 2/1962 | Lapeyre et al. | 17/71 |
| 3,084,379 | 4/1963 | Henning | 17/73 X |

FOREIGN PATENTS OR APPLICATIONS

| | | | |
|---|---|---|---|
| 444,868 | 2/1949 | Italy | 17/71 |

*Primary Examiner*—Lucie H. Laudenslager
*Attorney*—Stevens, Davis, Miller & Mosher

[57] ABSTRACT

A machine for peeling shrimps, in which shrimps are advanced in a channel formed by two counterrotating rollers. A shrimp is aligned so that its ventral side faces downwards in the channel, and while the shrimp is pressed down into the channel its dorsal shell is loosened from the meat by means of knives rotating with the rollers. After that, a longitudinal pull is exerted on the shrimp to separate its head from the edible meat. The shrimp may also be aligned in the head-to-tail direction. The aligning means may be mechanical or comprise liquid jets.

32 Claims, 17 Drawing Figures

SHRIMP-PEELING MACHINE

BACKGROUND OF THE INVENTION

This invention relates to a machine for peeling shrimps, comprising a pair of rollers, means for rotatably supporting said rollers in parallel relationship and means for rotating said rollers in opposite directions.

It is known, e.g., from U.S. Pat. No. 3,276,878, to peel shrimps by means of oscillating, inclined rollers which form a squeezing crotch or gap in which the shells are loosened and removed from the shrimp meat. Since the complete loosening of the shells, as far as some shrimps are concerned, requires repeated squeezing of the shrimps between the rollers, these have to be rather long in order that all the shrimps supplied are freed from their shells and other offal when discharged from the machine, although a significant percentage of the shrimps are already peeled at a rather short distance from the supply end of the machine. This not only leads to a great space requirement for the machine and to constructional and maintenance difficulties due to the long rollers, but entails, moreover, that the shrimps peeled first are repeatedly exposed to a mechanical action by the rollers, whereby they may be crushed to a greater or lesser degree so that part of the end product appears in the form of shrimp shreds or fragments or even in a comminuted form. The surface of the soft shrimp meat also becomes frayed and loses a part of its red color. Furthermore, during their travel along the rollers the peeled shrimps are exposed to the action of water with which the rollers are sprayed in order to facilitate the peeling and the removal of the offal. This has a deleterious effect on the quality, in that both flavor and color are leached from the peeled shrimps and in that the shrimp meat absorbs water.

From U.S. Pat. No. 2,853,733 there is known a machine having two rollers which rotate continuously and in opposite directions. The rollers operate, like the rollers of the machine referred to above, to pull the shell and legs of the shrimp from the meat. Consequently the rotation of the rollers in the crotch or nip is downwardly directed so that the roller surfaces tend to pull the shells downwardly in order to loosen them from the meat.

SUMMARY OF THE INVENTION

According to the invention there is provided a machine for peeling shrimps, comprising a pair of rollers, means for rotatably supporting said rollers in parallel relationship to form therebetween a shrimp-feeding channel having an inlet end and an outlet end, means for supplying shrimps to said inlet end of said channel, means for continuously rotating said rollers in opposite directions so that in said channels the roller surfaces move upwards against shrimps advancing in said channel, radially projecting knife means secured to each roller adjacent said outlet end, means located above said knife means for engaging the dorsal side of a shrimp to press said shrimp down into said channel, aligning means located above said feeding channel between said inlet end and said knife means and arranged for orienting shrimps sidewise so that after having passed said orienting means a shrimp has its ventral side facing downwards in said channel, and means located downstream of said outlet end for tearing the head of a shrimp from the body portion thereof.

Due to the aligning or orienting of the shrimps in the dorsal-to-ventral direction and the subsequent cutting action of the rotating knife means, the dorsal shell of the shrimps, i.e., the front part of the shell behind the so-called "head"—which actually also include the body portion of the shrimp with the viscera—is forcibly cut free of the meat of the shrimp and thereafter the head and the tail shield can easily be removed from the meat, e.g., by pulling forces exerted in opposite longitudinal directions upon said parts of the shrimp. Dependent upon the circumstances, the dorsal shell may either be pulled off in the same operation as the head, or the head may be removed separately and the loosened dorsal shell may subsequently be removed simultaneously with the tail shell by means of a device operating with oscillating rollers of the above-mentioned type. In all cases the complete separation of the meat from the shell may be effected faster than be previously employed machines and methods, so that the above-mentioned harmful effects on the quality and appearance of the shrimp meat, which are due to the relatively slow and long-lasting processing, are avoided. The separate removal of the head has the further effect that undesired parts of the shrimps, in particular eyes and stomachs, which have a soft consistency similar to that of the shrimp meat, and which therefore follow the meat through the peeling machine operating on the known principles, may now be removed in one operation from the shrimp meat so that the previously necessary and very time-consuming manual afterpeeling or cleaning of the shrimp meat may be dispensed with.

Turning means may comprise a separate section of one feeder roller which rotates in the opposite direction of the remaining length of the roller and stationary means located adjacent said roller section and arranged to press a passing shrimp downwards in the feeder channel.

In a preferred embodiment the means for orienting or aligning the shrimps in the dorsal-to-ventral direction comprises at least one nozzle located at that roller section which, during the rotation, moves downwards into the feeder channel, and arranged to discharge a jet of water substantially tangential in relation to the roller section.

It has been found that in this way a more reliable turning of those shrimps may be achieved, which lie incorrectly in the feeder channel, i.e., with the dorsal side downwards, than with a turning means in the form of a stationary guide rail having a helical edge which, by mechanical action on the shrimp presses it downwards to effect the turning. It is a particular advantage that the action of the jet of water is independent of the size of the shrimp, so that a less accurate sorting or grading of the shrimps supplied to the machine does not influence its function.

A second nozzle may be disposed downstream of the first nozzle for discharging a jet of water substantially in tangential direction towards the upper side of the roller section and substantially parallel to the plane through the axes of the rollers, and after the second nozzle a third nozzle, corresponding to the first one, may be provided. With the water jet of the second nozzle, shrimps that lie in a "lump" on top of each other, may be separated, so that they continue singly and consecutively in the channel. One or more of the separated shrimps may proceed dorsal side downwards and the third nozzle will then ensure that these shrimps will also be turned correctly before they arrive at the knives.

For still greater reliability, a fourth nozzle may be disposed close to the third nozzle, which fourth nozzle discharges a jet of water directed downwards towards the feeder channel and substantially tangential to the roller section.

The surface of each feeder roller may be provided with a helical rib which produces or assists the feeding action of the rollers, and the pitch of the ribs may be larger in the region of the turning means than in the preceding region. Thus a certain separation of the shrimps is ensured in the region around the turning means, whose function is thereby made more reliable.

When the aligning means comprises one or more nozzles, the pitch of the ribs may increase stepwise at or immediately after the first alignment nozzle. The sudden acceleration of the shrimp at the place where the pitch of the ribs increases, may in some cases—in addition to increasing the spacing of the shrimps in the direction of advance—assist in promoting the turning of those shrimps which are facing with the dorsal side downwards and thereby assist the aligning action of the jet of water.

The means for ripping off the head of the shrimps may comprise two successively disposed pairs of rollers with essentially vertical axes of rotation situated in planes at right angles to the feeding direction, the rollers of each pair being spring loaded towards each other and driven synchronously in opposite directions at circumferential velocities which are highest for the pair of rollers remote from the feeder channel. This embodiment has the advantage that the dorsal shell is removed simultaneously with the head since a pull is exerted in the longitudinal direction of the shrimp due to the difference between the peripheral roller speeds. It will be seen that the effect of the pull is the same irrespective of whether the shrimp has its head or its tail facing forward in the direction of movement. There is, however, reason to suppose that it may be advantageous to align the shrimps endwise so that they are supplied to the tearing rollers with the head facing forward in the direction of movement.

There may be a pair of guide rollers provided between the feeder channel and the first pair of tearing rollers and rotating at substantially the same circumferential speed as the first pair of rollers. The guiding rollers may be spring loaded towards each other to a minimum distance approximately equal to the thickness of the shrimps, which facilitates the introduction of the shrimps between the sets of tearing rollers.

Below the conveying rollers, immediately downstream of the rotating knives, a pair of counterrotating rollers may be disposed for pulling the tail shell of the shrimp down into the feeder channel, so that the tail shell is removed at once after the loosening of the dorsal shell and the shrimps are peeled ready when the head is ripped off at the end of the feeder channel.

Further features and advantages of the invention and its various embodiments will appear from the following description in which reference is made to the accompanying drawings.

BRIEF DESCRIPTION OF THE DRAWINGS

FIG. 4 is a section along line IV—IV in FIG. 1a, showing the cutting members at the ends of the rollers of the machine;

FIG. 9 is a section along line IX—IX in FIG. 5a;

FIG. 10 is a fragmentary view seen in the direction of the arrow X in FIG. 5a;

DESCRIPTION OF THE FIRST EMBODIMENT

Figure 1A:
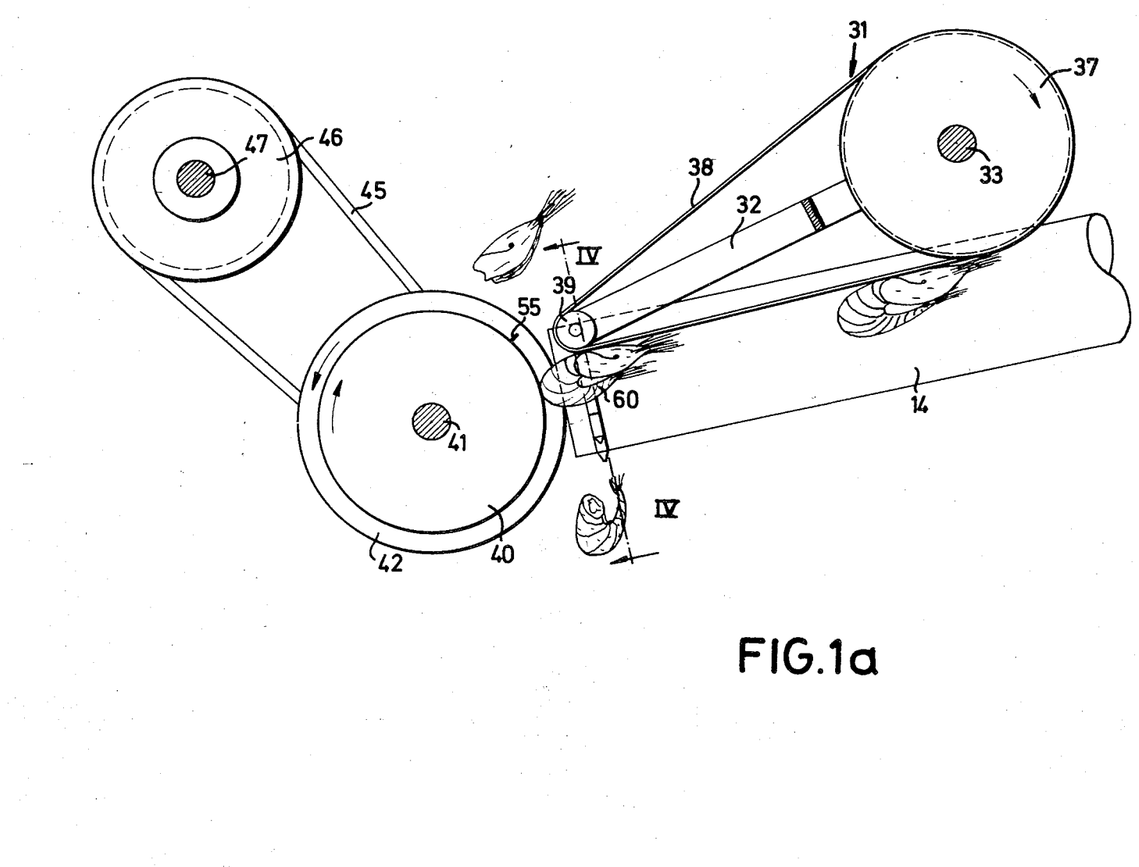
FIG. 1a and FIG. 1b together are a vertical section, along the line I—I of FIGS. 2a and 2b, through a first embodiment of the machine according to the invention, the figures showing only those parts which are believed to be essential for understanding the invention.
Figure 1B:
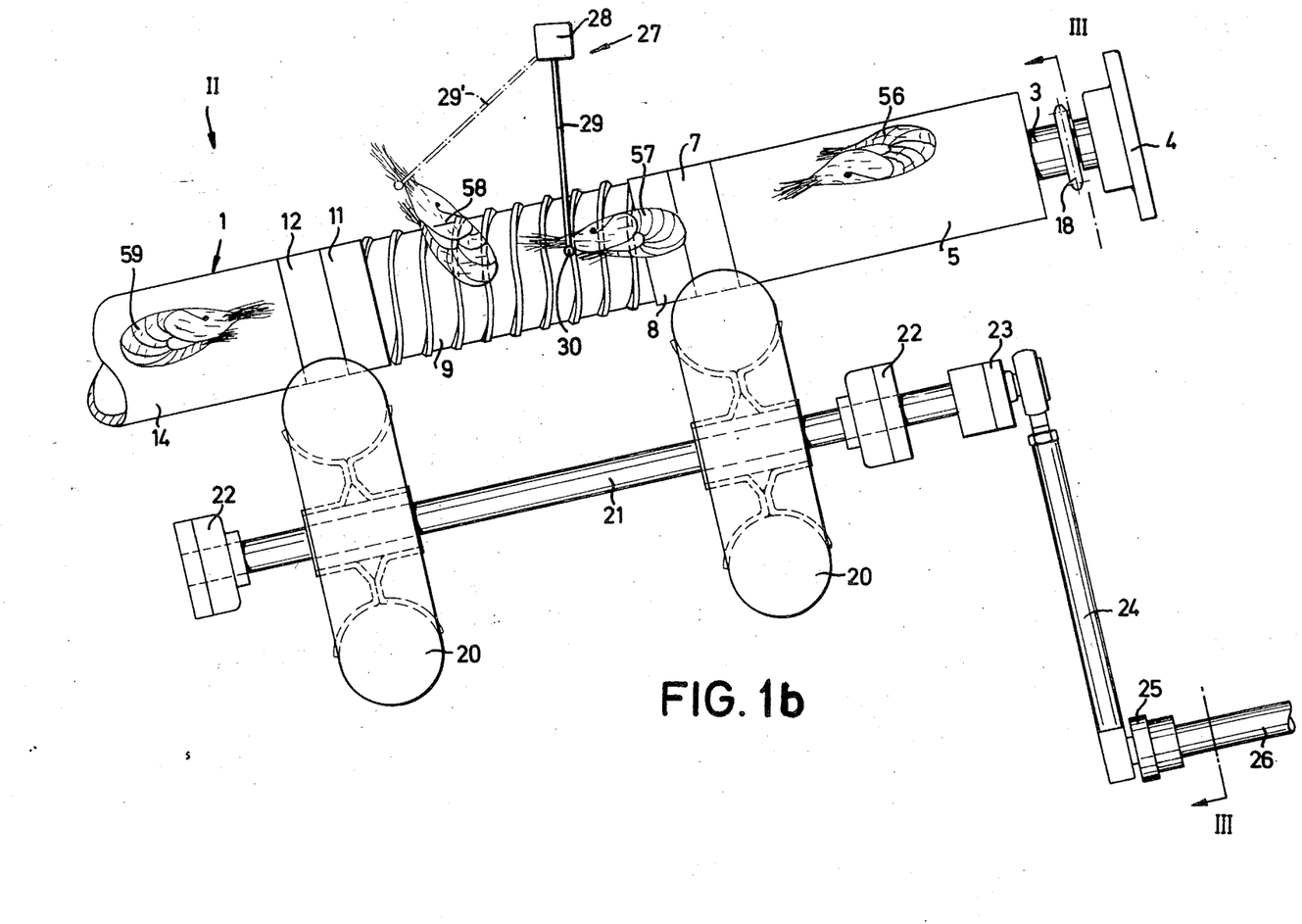
Figure 2A:
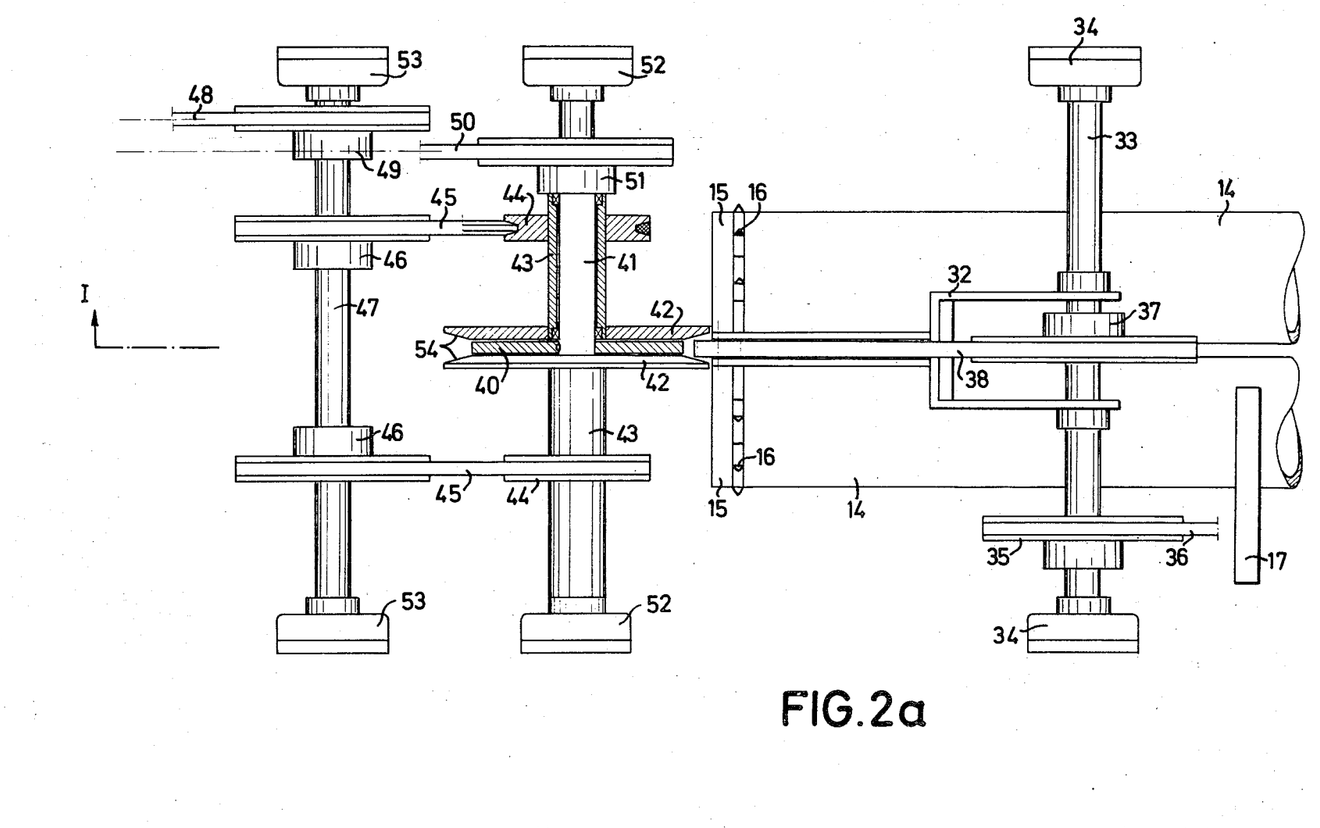
FIGS. 2a and 2b together are a plan view, partly in section, seen in the direction of the arrow II in FIG. 1b.
Figure 2B:
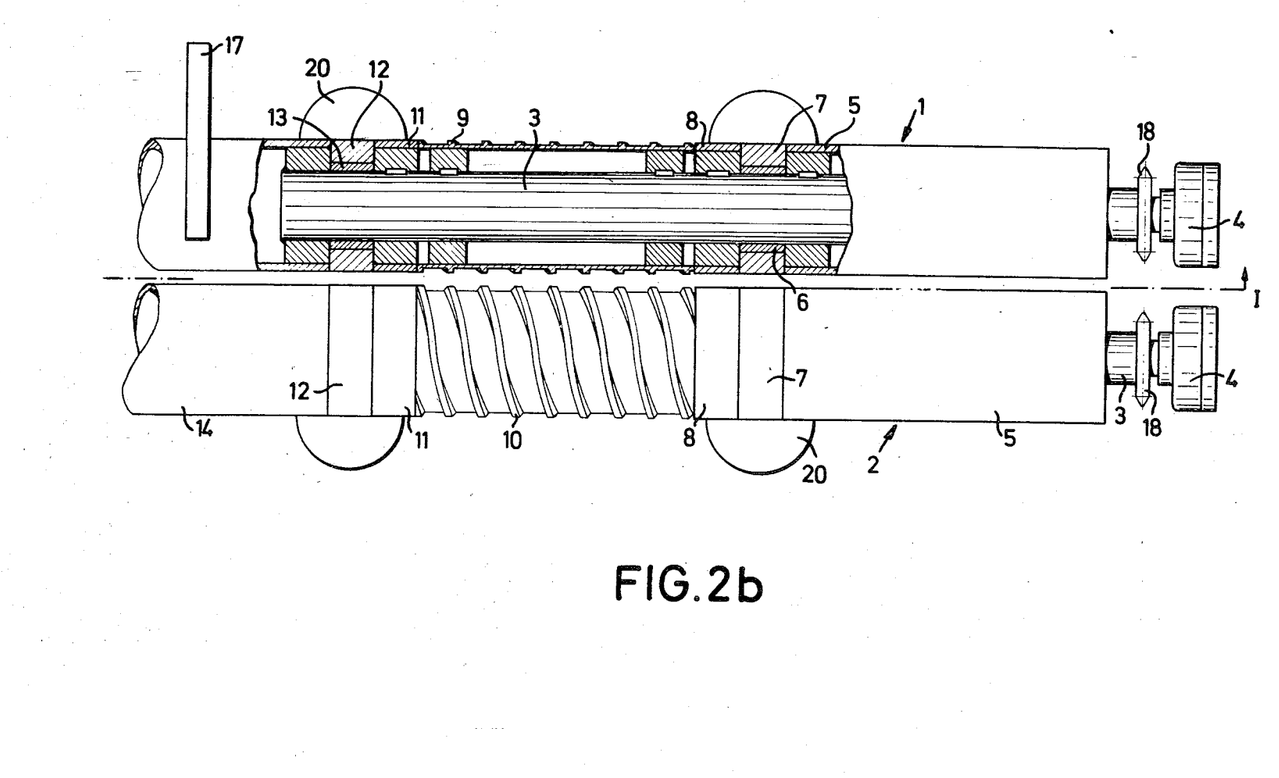

The machine shown in FIGS. 1–4 comprises two rollers generally denoted by 1 and 2, which are rotatably journaled in a frame, not shown, preferably in such a way that the downward inclination of the rollers from the supply end of the machine, which is seen to the right in FIGS. 1 and 2, to its discharge end can be adjusted. Each roller comprises a central shaft 3, which at its uppermost end is supported in a preferably spherical ball of roller bearing in a bearing housing 4, which is secured to the frame, not shown.

Each of the rollers 1 and 2 comprises in sequence starting from the topmost or supply end the following sections. First there is a piece of tube 5, preferably made of metal with a smooth surface, nonrotatably secured to the shaft 3. After that comes a sleeve 7 of rubber or similar material rotatably supported on the shaft by means of a bushing 6, followed by a short, smooth piece of tube 8 secured to the shaft 3. Now follows a piece of tube 9 and 10, respectively, likewise secured to the shaft 3 and rotating therewith. As is seen in FIGS. 1 and 2, the pieces of tube 9 and 10 are provided with helical ribs having a left- and right-hand pitch, respectively. The pieces of tube 9 and 10 are followed by two smooth tube sections 11 which each is secured to the associated shaft 3, and two rubber sleeves 12 which, by means of bushings 13 are rotatably supported on the shafts 3, like the sleeves 7. The sleeves 12 are followed by two smooth pieces of tube 14 and the rollers terminate in two narrow discs 15 each secured to the associated shaft 3 and carrying a plurality of knives 16, which will be described later in more detail.

At their lowermost sections 14, the rollers are supported in two bearing plates 17 extending from opposite sides towards the gap between the rollers. Each plate 17 has a bearing recess which partially surrounds the roller section 14. The bearing plates 17, which can be manufactured of polyamide or similar material, are preferably adjustably fixed to the frame of the machine, not shown, in such a way that the width of the gap between the rollers can be varied.

Figure 3:
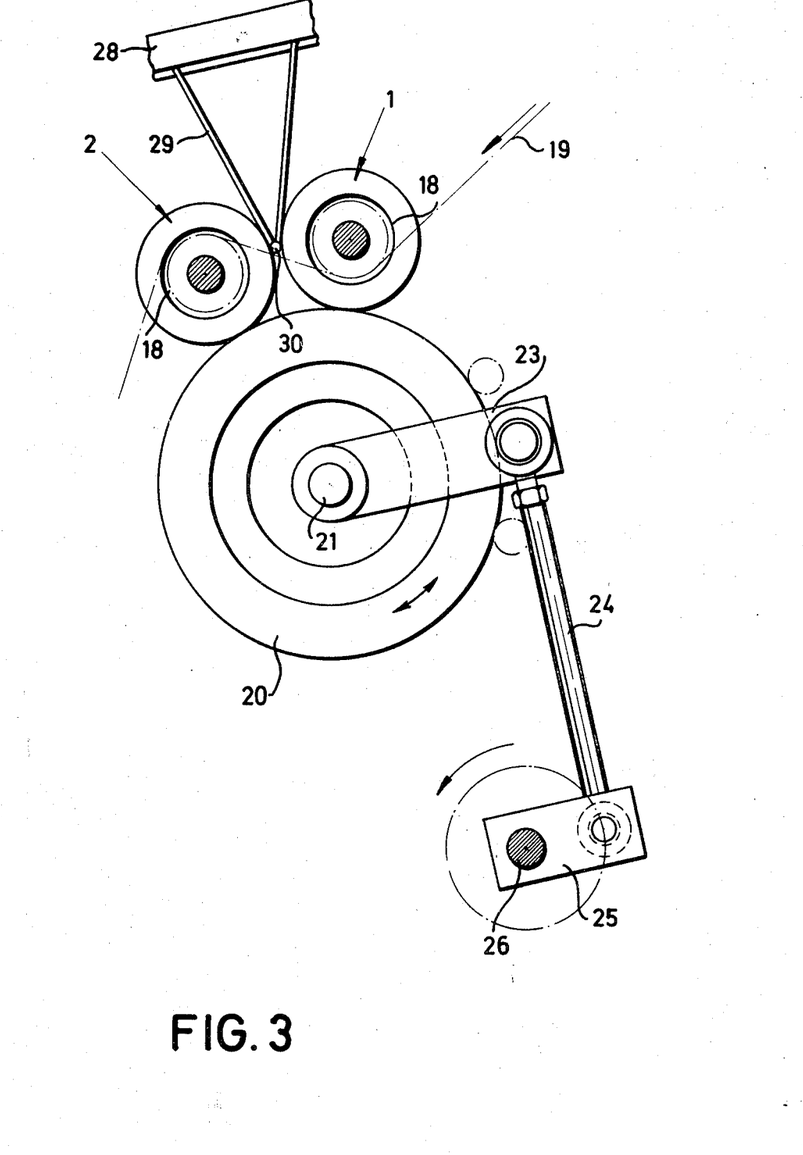
FIG. 3 is a section along line III—III in FIG. 1b.

To the uppermost end of each roller shaft 3, a sprocket wheel 18 is secured outside the bearing housing 4, and a chain 19 driven via a suitable gear by the drive motor of the machine, not shown, in the direction of the arrow shown, meshes with the two sprocket wheels 18 in the manner shown in FIG. 3. The two wheels 18 and thereby the rollers 1 and 2 are thus caused to rotate continuously in the directions of rotation marked with arrows. The two sets of rotatably supported sleeves 7 and 12 effect an oscillating rotation, synchronously and in the same direction of rotation, since each set of sleeves is driven by friction via an oscillating drive roller 20, which may be made of rubber and which is secured to a shaft 21 supported in bearings 22 secured to the frame, not shown. To the shaft 21 there is secured a crank arm 23 which, via a preferably longitudinally adjustable pushrod 24, is coupled to a crank arm 25 on a shaft 26 driven by the drive motor of the machine. When shaft 26 rotates constantly in the direction indicated with an arrow in FIG. 3, the arm 23 and hence the shaft 21 are caused to effect an oscillating movement between the extreme positions marked with dot-and-dash lines and this oscillating movement is transmitted via the driving rollers 20 to the four sleeves 7 and 12.

Above the two roller sections 9 and 10 provided with helical ribs, a catching member generally denoted by 27 is suspended pivotally in the frame of the machine. As shown, the catching member consists of a shaft 28 which is supported in the frame by its ends and to which a V-shaped bracket or stirrup 29 made of relatively thin wire, e.g., stainless steel wire, is secured. The tip of the bracket 29 extends down into the gap between the two roller sections 9 and 10 and may be provided with an enlargement or bead 30, which may be a ball fixed to the bracket wire. The bracket 29 is shown in FIG. 3 with rectilinear prongs which, however, in the proximity of the gap between the rollers may be curved so as to follow the roller contour. This feature may assist in ensuring that the protruding "horn" on a shrimp that encounters the bracket with the head facing forward, is intercepted by the catching member as described later.

Above the two roller sections 14 there is provided a pressure member generally designated by 31, which serves to hold the shrimps down against the surface of the rollers. The member 31 comprises a frame 32 which is pivotally supported by a shaft 33 journaled in bearings 34 secured to the frame of the machine. A pulley 35 is secured to the shaft 33 and driven from a motor, not shown, via a belt 36. Preferably the drive includes an infinitely variable gear. To the shaft 33 there is, furthermore, between the two legs of the fork-shaped frame 32, secured a pulley 37. A belt 38 which may be a toothed belt, is trained over the pulley 37 and a further pulley or roll 39 rotatably supported in frame 32 and situated above the lowermost end of the rollers 1 and 2. The frame may be weight or spring loaded in downward direction towards the rollers and when the shaft 33 rotates in the direction marked with an arrow in FIG. 1, the lower strand of the belt 38, which extends essentially parallel to the rollers, assists in feeding the shrimps forward between the two rollers. At the same time, the belt keeps the shrimps down in the feeding channel or gap between the rollers.

In front of the lowermost ends of the rollers 1 and 2, means is provided for the separation of the head of a shrimp from its tail. This means comprises a disc 40 which is secured to a horizontal shaft 41 and disposed in the same vertical plane as the gap between the rollers 1 and 2, as well as two discs 42 situated on opposite sides of the disc 40 and secured each to a separate hollow shaft 43, which is pivotally supported on the through shaft 41. To each of the hollow shafts 43, a pulley 44 is secured which, via a belt 45 is driven from a pulley 46 on a shaft 47 parallel to the shaft 41. The shaft 47 is driven from a motor, not shown, via a belt 48 and a pulley 49 secured to the shaft, and the shaft 41 is driven in a like manner via a belt 50 and a pulley 51 secured to that shaft. The shafts 41 and 47 are supported in bearings 52 and 53, respectively, secured to the frame, not shown, of the machine.

The two discs 42 have, as seen in FIG. 1, conical surfaces 54 facing the central disc 40 which latter, in its circumference, has a projecting spike 55, as seen in FIG. 1. In FIG. 1 the directions of rotation of the disc 40 and the discs 42, respectively, are marked with arrows.

In addition to the component parts described above and shown in the drawings, the machine may have means in the form of nozzles or the like, which, during the operation of the machine keep the surfaces of the rollers 1 and 2 constantly wetted in order to facilitate the advancing or feeding of the shrimps along the rollers and to keep the rollers clean. Especially in connection with the two sets of oscillating sleeves 7 and 12, separate nozzles or the like may be provided to keep the surface of one sleeve constantly covered by a thin film of water, which has proved to be particularly advantageous for sidewise or lateral turning of the shrimps between the sleeves, described below.

By means of supply means, not shown, a substantially even flow of shrimps is fed to the supply end of the machine, i.e., the uppermost right-hand end of the rollers 1 and 2 in FIGS. 1 and 2. The shrimps will have been boiled in advance and should also be graded or sorted according to size in order to avoid too great variations between the dimensions of the individual shrimps in a portion which is being processed with a given adjustment of the adjustable parts of the machine. It will normally be sufficient if the shrimps in a normal catch are graded into three group sizes, so that at the same time only shrimps within a single one of these groups are processed. The shrimps enter on the uppermost roller sections 5 in haphazard positions, and in FIG. 1, a shrimp 56 is shown which has its dorsal side facing downwards into the gap between the rollers and has its head pointing forward in the conveying direction. The conveying or feeding of the shrimps through the machine occurs under the influence of gravity assisted by the above-described rotation of the rollers 1 and 2 in opposite directions, cf. FIG. 2. When a shrimp arrives onto the oscillating roller sections 7 from the smooth first roller sections 5, the shrimp, if it lies on its back like the shrimp 56, will be caught by one of the rollers and be turned sidewise in a rapid movement, so that the shrimp proceeds onto the smooth roller section 8 with the ventral side and tail facing downwards in the gap between the rollers, cf. the shrimp 57 shown in FIG. 1. If the shrimp already lies in the correct position, i.e., with the ventral side downwards, its position is not influenced by the oscillating roller sections, so that all shrimps arriving onto the roller sections 9 and 10 provided with spiral ribs, lie with the ventral side down in the gap between the rollers, whereas they have either their heads or tails pointing forward.

When the shrimp arrives head forward, cf. the shrimp 57 in FIG. 1, the projecting "horn" on the shrimp head is caught by the downwards-facing bracket 29, and since the shrimp is still conveyed forwards, which conveying in this section is assisted by the helical ribs on the roller sections 9 and 10, it will tend to entrain the bracket 29 which therefore swings upwards into the position 29' shown with dot-and-dash lines in FIG. 1. In this position, the shrimp is designated by 58 and it will be understood that during its continued downwards movement between the roller the shrimp will be turned endwise or upside down, so that finally it lies tail first and the dorsal side down in the gap between the rollers. FIG. 1 also illustrates that the positive advancing of the shrimp by means of the helical ribs is of particular importance due to the partial lifting of the shrimp by means of the pivoting bracket 29.

When the shrimp has thus been turned upside down, it proceeds via the smooth roller sections 11 onto the oscillating roller sections 12, which turn the shrimp sidewise in the same way as the aforesaid roller sections 7. The shrimp thereafter proceeds onto the final smooth roller sections 14 in the position marked by 59, i.e., tail first in the direction of movement and with the ventral side down in the gap between the rollers 1 and 2. If the shrimp already had its tail facing forward when encountering the bracket 29, i.e., in the opposite direction as that shown in respect of shrimp 57, it would merely raise the bracket 29 but otherwise pass freely therebelow without being turned endwise. The following oscillating roller sections 12 do not bring about any change in the orientation or alignment of such a shrimp, which will be clear from the above explanation of the operation of the roller sections 7.

Consequently, on the roller sections 14, all shrimps occupy the position shown at 59 and when they are fed to the counter-rotating discs 40 and 42 by means of the belt 38 of the pressure member 31, the curved end of the shrimp is struck by the spike 55 on the rapidly rotating disc 40. Simultaneously the head of the shrimp, which is broader or thicker than the tail portion is caught by the opposedly rotating discs 42 so that the head and tail are torn from each other and thrown in different directions due to the rotation of the discs, in the way indicated in FIG. 1. The heads can be collected in a container or on a conveying means which conducts them away from the machine, while the tails, in a like manner, are collected and conveyed further for final peeling.

The final peeling of the shrimps, i.e., the tails, is facilitated significantly by means of the above-mentioned knives 16 which are disposed on the lowermost end of each roller and which rotate therewith. As is seen from FIG. 4, the knives are adjusted in such a way that they penetrate from underneath below the slightly outwards-projecting edges of the foremost part of the shell of the shrimp immediately behind the head, and by means of such knives it has proved possible to loosen, and in certain cases, to all intents and purposes, to remove the shell from the shrimp. Since the removal of the part of the shell referred to, in hitherto known peeling methods, is the most difficult stage in the peeling operation, which consequently determinates the duration of the peeling, it is of great importance that it is possible, by means of the knives 16, to carry out a significant part of the peeling simultaneously with the removal of the head.

DESCRIPTION OF SECOND EMBODIMENT

Figures 4, 9, 10:
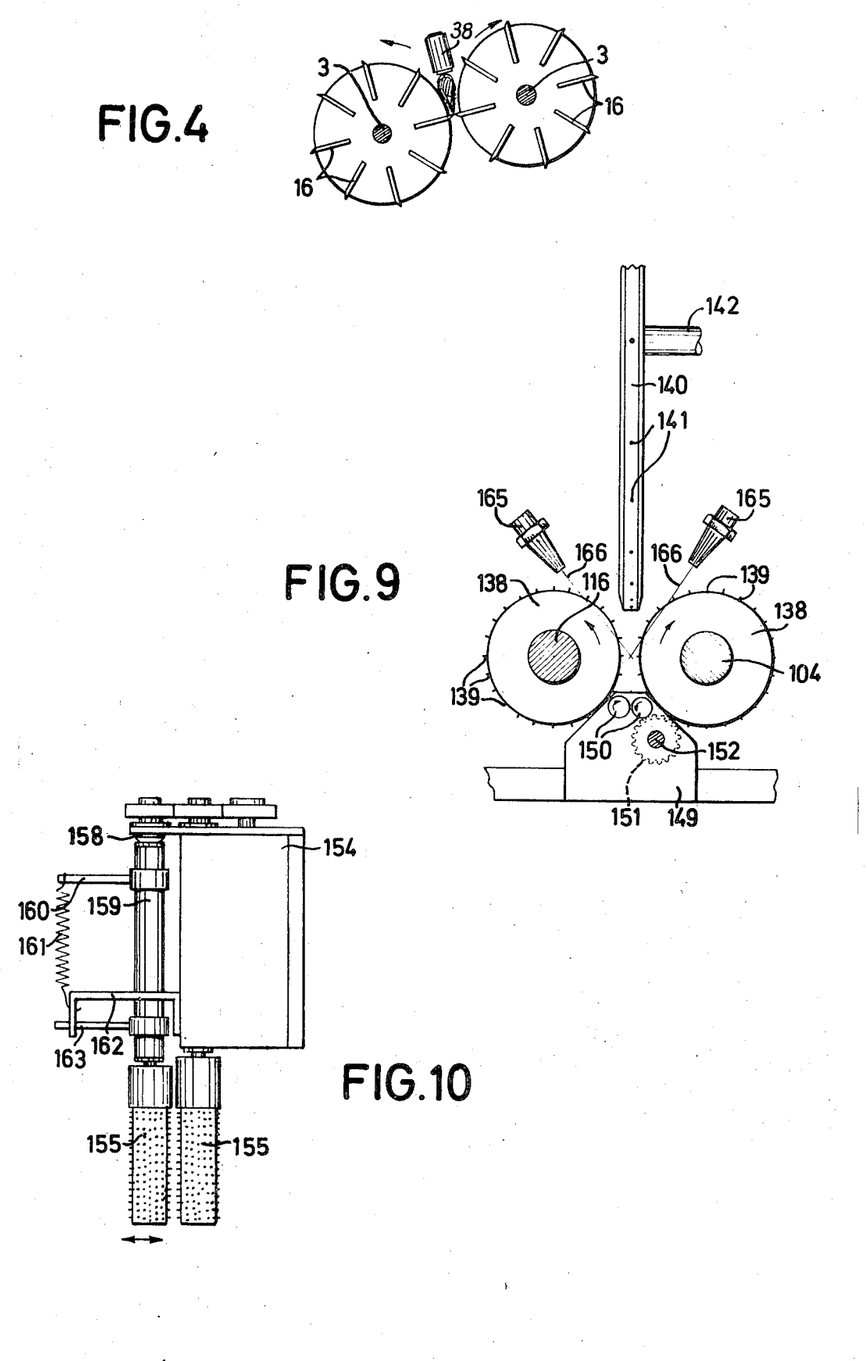
Figure 5A:
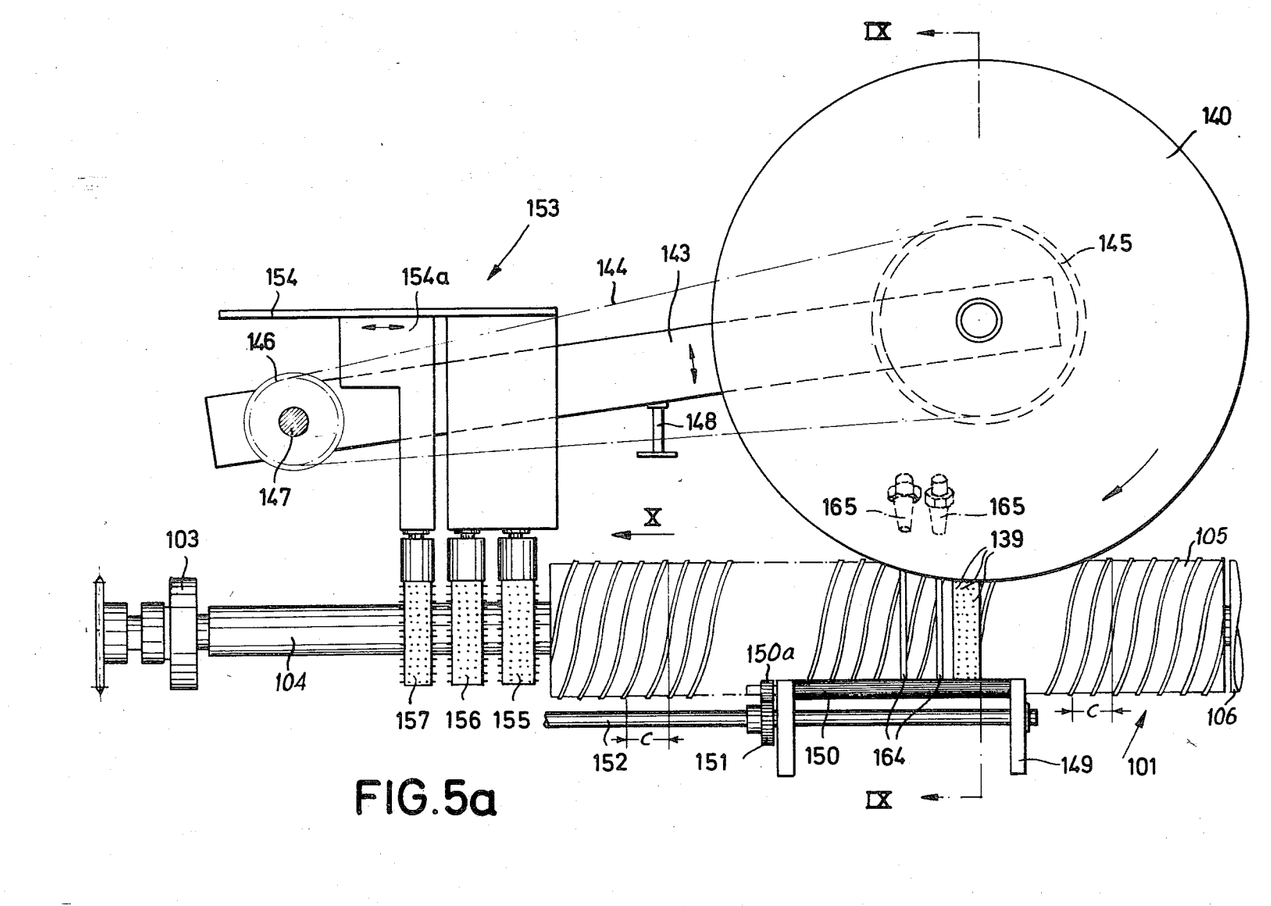
FIGS. 5a and 5b together are a vertical section corresponding to FIGS. 1a and 1b, taken along line V—V of FIGS. 6a and 6b, showing a second embodiment of the machine according to the invention.
Figure 5B:
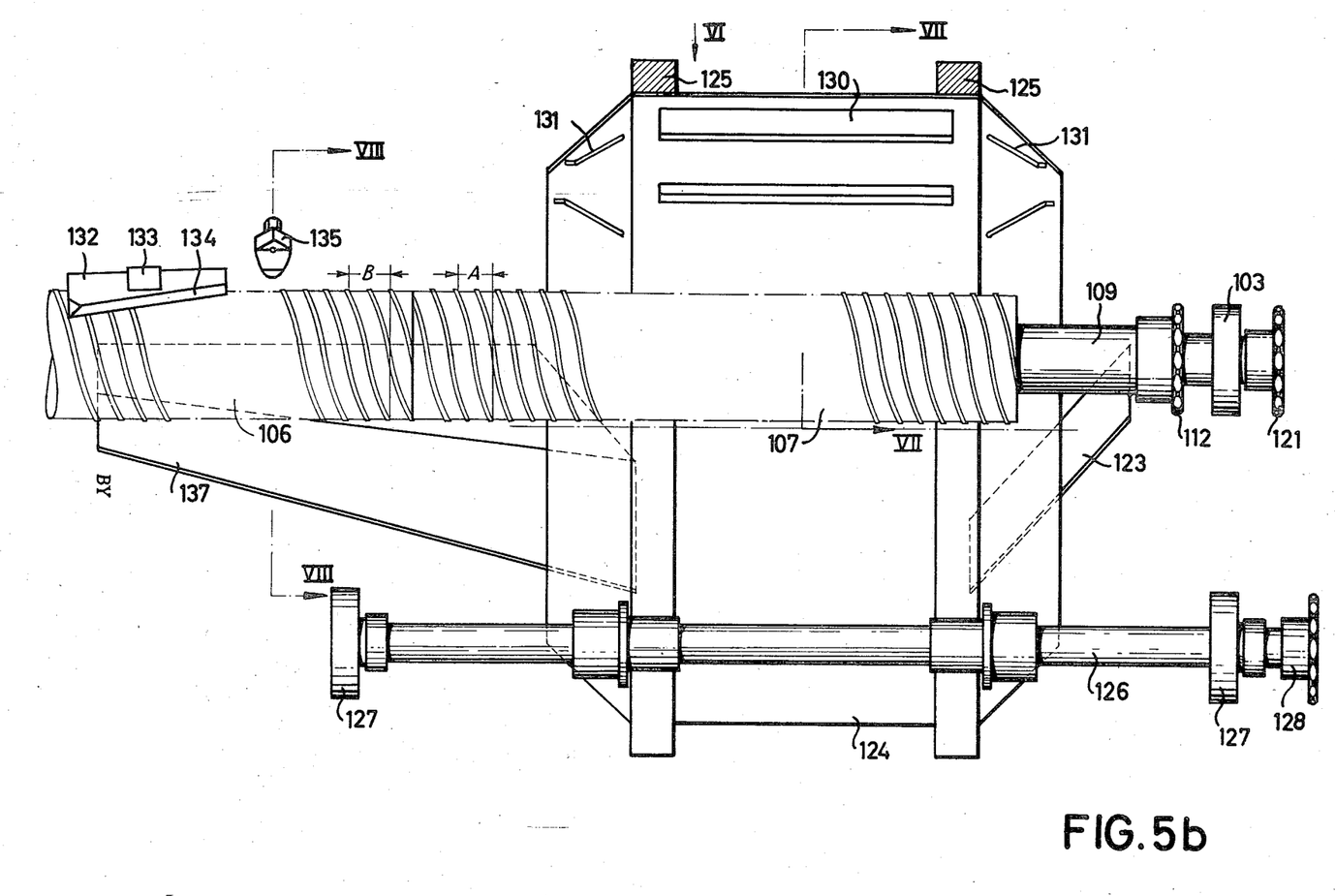
Figure 6A:
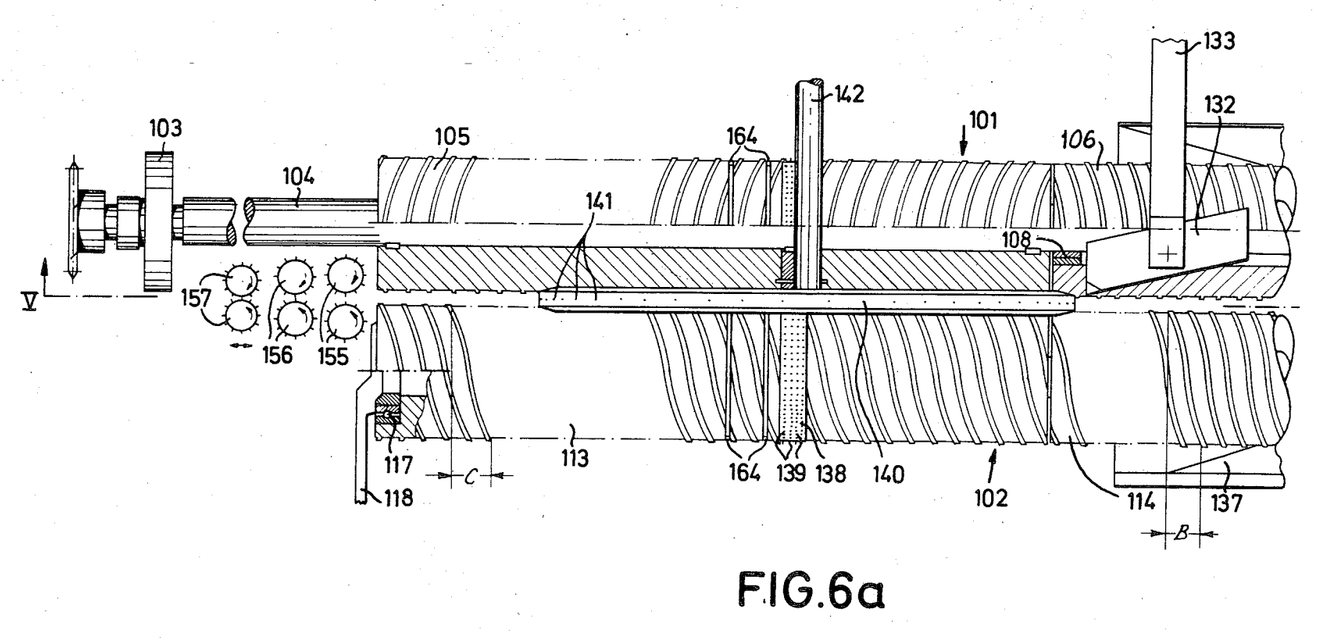
FIGS. 6a and 6b together are a plan view, partly in section in the direction of the arrow VI in FIG. 5b.
Figure 6B:
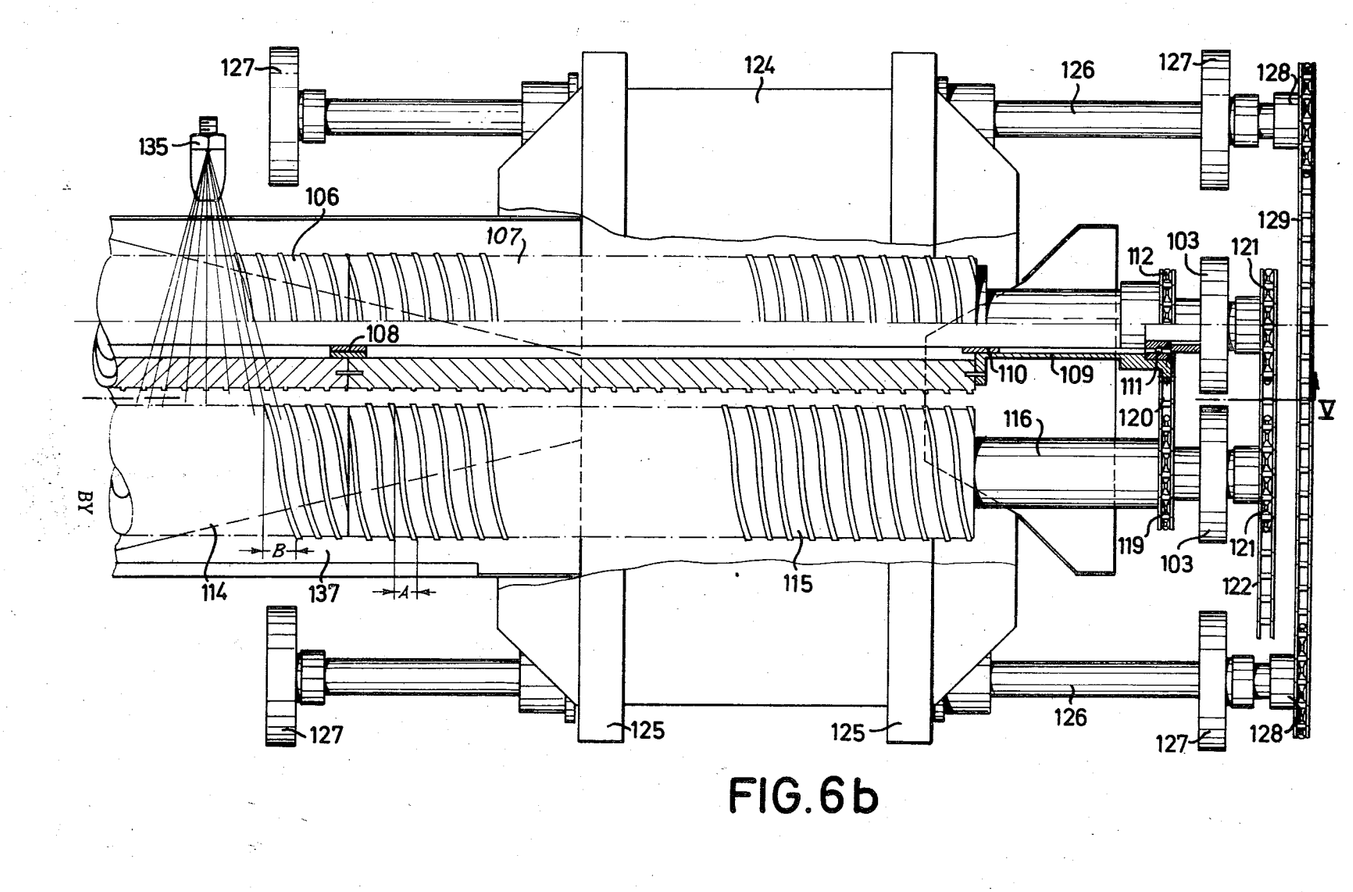

In the embodiment in FIGS. 5–10, a feeder channel or groove for shrimps is formed by two parallel, horizontal rollers 101 and 102, which are supported in the frame of the apparatus, not shown in greater detail. In FIGS. 5 and 6, there are shown two bearing housings 103 for the roller 101 and one housing 103 for the right-hand end of the roller 102. The roller 101 has a central shaft 104 supported in the two bearing housings 103, and the part of the roller 101 situated nearest to the discharge end of the feeder channel comprises a two-piece roller section 105 which is fixed to the shaft 104. The part of the roller 101 situated nearest to the supply end, i.e., to the right in FIGS. 5 and 6, comprises two mutually connected tubular roller sections 106 and 107 which, by means of bearing bushings 108 are rotatably supported on the shaft 104. The roller section 107 is secured to a hollow shaft 109, which is rotatably supported on the shaft 104 by means of a bearing bushing 110 and a ball bearing 111. The outermost end of the hollow shaft is formed into a sprocket wheel 112.

The roller 102 consists of three tubular roller sections 113, 114 and 115, which are disposed opposite to the roller sections 105, 106 and 107, respectively, and which each has the same length as the corresponding section of the roller 101. The three sections 113, 114 and 115 are all secured to a through shaft 116 which, at its right-hand end, is supported in a bearing housing 103 attached to the frame of the apparatus, while a ball bearing 117, supports the left-hand end of the roller 102 relative to the frame of the apparatus.

To the right-hand end of the shaft 116, a sprocket wheel 119 is secured and a chain 120 connects the wheel 119 with the sprocket wheel 112 on the hollow shaft 109, so that the two roller sections 106 and 107 rotate in the same direction as the entire roller 102. To the outermost end of the shaft 116, another sprocket wheel 121 is fixed and a corresponding sprocket wheel is secured to the end of the shaft 104. A chain 122 is trained over the two sprocket wheels 121 and a sprocket wheel on a main drive shaft, not shown, in such a way that the shaft 104 and thereby the roller section 105 rotate in the opposite direction of the shaft 116 and the roller 102. The directions of rotation of the said roller sections are seen, inter alia, in FIG. 9.

All roller sections are on their surface provided with helical ribs, which can either be machined from the surface of the roller or manufactured by soldering or welding wires or narrow bands to the roller surfaces. As shown in FIGS. 5 and 6, the ribs on the roller section 105 have a left-hand pitch, while the ribs on the five other roller sections have a right-hand pitch. This means that with the directions of rotation shown for the two shafts, all ribs act in transporting shrimps from the right to the left in the feeder channel between the two rollers. The ribs are shown with a pitch that is relatively small on the roller sections 107 and 115 and relatively large on the roller sections 105 and 113, while the pitch on the two central sections 106 and 114 has an intermediate value. In this way, the ribs assist in increasing the distance between shrimps fed in succession along the channel.

The shrimps, which are boiled in advance and by preference are subjected to a certain grading, are supplied from conveying means not shown via a chute 123 situated at the right-hand end of the rollers. The chute leads into a rotatably supported drum 124, which surrounds the supply end of the two rollers 101 and 102. The drum carries two barrel rings 125, by means of which the drum is supported and driven by two shafts 126 that are disposed below the rollers 101 and 102 and supported in bearing houses 127 attached to the frame of the apparatus. To each of the shafts 126, a sprocket wheel 128 is secured which is driven by a chain 129 from the main drive shaft, not shown.

Figure 7:
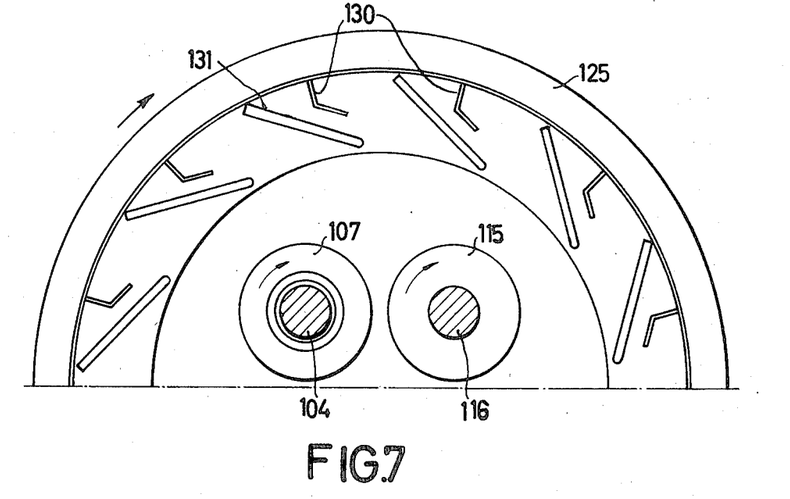
FIG. 7 is a section along line VII—VII in FIG. 5b.

The cylindrical inner wall and the two frustum-shaped end walls of the drum carry catchplates 130 and 131, and when the drum rotates in the direction shown by an arrow in FIG. 7, the catchplates lift the shrimps from the bottom of the drum and let them drop down between the two conveying rollers, whose distance is selected so that the shrimps do not drop through the gap, but are transported to the left as a result of the action of the ribs provided on the surfaces of the rollers.

Figure 8:
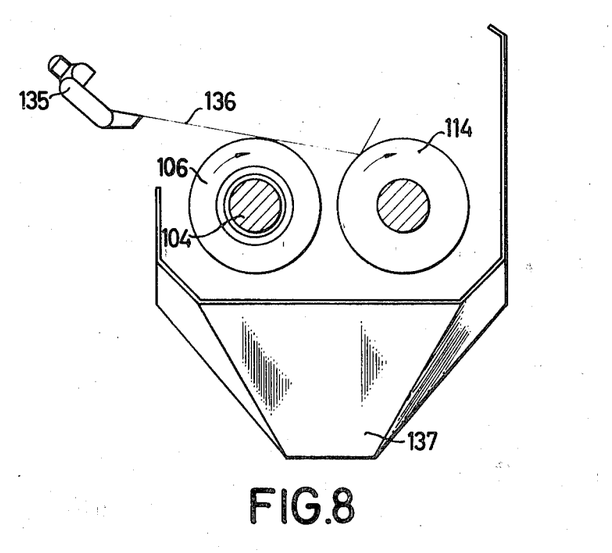
FIG. 8 is a section along line VIII—VIII in FIG. 5b.

A little distance to the left of the drum 124 and above the feeder channel there is provided a turning or aligning means 132 which, in the embodiment shown, comprises a rectilinear or twisted rail which is secured to an arm 133, preferably so that a certain adjustment of the position of the active edge 134 of rail 132 relative to the feeder channel between the rollers is possible. A nozzle 135 is disposed close upstream of the rail 132 and arranged to direct a thin, fan-shaped jet of water 136 towards the two rollers. The location of the nozzle and the direction of the jet of water are seen in FIGS. 6b and 8.

When a shrimp comes into contact with the edge 134 of the rail 132, the rail will momentarily tend to press the shrimp down into the gap between the two roller sections 106 and 114, while the roller 114 tends to raise the shrimp on the opposite side. If the shrimp comes to the edge 134 with its curved back or dorsal side facing downwards into the channel between the two roller sections, the effect will be that the shrimp turns 180° around its longitudinal axis, so that it continues its movement with the ventral side facing downwards in the feeder channel. If, on the other hand, the shrimp already has its ventral side facing downwards when it arrives at the rail 132, no turning of the shrimp takes place and consequently, all the shrimps leave the turning means with the ventral side facing downwards into the feeder channel. The said turning is assisted further by the action of the jet of water 136 which also has the effect of breaking up possible heaps or accumulations of shrimps upstream of the turning means, so that the shrimps are fed singly past the edge 134. Shrimps that are flushed away by the jet of water 136 and shrimps which, when being turned, are raised right above the roller section 114, drop down into a chute 137 which leads them back to the drum 124.

The shrimps now all aligned or oriented in the dorsal-to-ventral direction proceed on to the two counterrotating roller sections 105 and 113 which on a short part of their length between their ends are interrupted by inserted rings 138 secured to the roller sections and rotating therewith. On their circumference the rings 138 carry projecting cutting means 139. The cutting means 139 may simply consist of steel pins which are hardened and surface-ground on their ends and pressed into the rings 138 with their surface-ground, cutting ends projecting slightly from the circumference of each ring and hence from the roller surface.

The two cutting means carrying rings 138 cooperate with a counterpressure member 140 which comprises a circular disc, in the circumference of which projecting pins 141 are fitted. The protruding ends of the pins are conical and rounded. The disc 140 is secured to the shaft 142 which is rotatably supported in a pivotal frame 143 positioned laterally offset from the rollers. The shaft 142 is driven by means of a belt or chain 144 which runs across a pulley 145 on the shaft and a second pulley 146 on a shaft 147, which is coaxial with the pivot axis of frame 143. The shaft 147 may be driven from the aforesaid main drive shaft and in such a way that the disc 140 rotates in the direction shown with an arrow in FIG. 5. The frame 143 may be weight or spring loaded in the direction of a stop 148, which limits its movement downwards against the conveying rollers.

The disc 140 with the projecting pins 141 ensures that the shrimps, when passing the cutting means 139, are pressed down into the channel between the two conveying rollers, so that when the rollers rotate, the cutting means cut below the dorsal shell of the shrimps, i.e., the foremost part of the shell situated behind the head of the shrimp, which is thereby loosened from the meat of the shrimp on both sides of the shrimp on a significant part of the distance from the ventral to the dorsal side of the shrimp.

In a frame 149, which constitutes a part of the frame of the machine and which is disposed below the two conveying rollers in the region of the cutting means 139, two longitudinally fluted rollers 150 are rotatably supported. As shown in FIGS. 5 and 9, the rollers extend parallel to the feeder channel between the two conveying rollers and they are driven synchronously in opposite directions via a gearwheel 151 secured to a shaft 152 which, in a manner not shown in detail, is driven from the previously mentioned main shaft of the machine. A gear wheel 150a is rigidly connected with each roller 150 and one gearwheel 150a is in driving connection with gearwheel 151 as seen in FIG. 5a. The rollers 150 are in engagement as shown in FIG. 9. Due to the rotation of the rollers 150 in the directions of rotation shown with arrows in FIG. 9, the rollers catch and grip the tail of the shrimp extending down into the feeder channel between the two conveying rollers 101 and 102, and as soon as the dorsal shell of the shrimp has been loosened by means of the cutting means 139 as described above, the rollers 150 will be able to pull the tail shell, i.e., the part lying behind the dorsal shell, free of the shrimp meat while the shrimp continues its movement to the left in the feeder channel. Underneath the rollers 150 there may be disposed means, not shown, for conveying the removed tail shells away.

The shrimp now proceeds with the loosened dorsal shell to the left-hand end of the two roller sections 105 and 113, where a unit for tearing or ripping off the head of the shrimp, generally designated by 153, is disposed in front of the channel between the roller sections. The unit consists of a diagrammatically shown frame 154 which, in a way not shown in detail, is secured to the frame of the machine and which comprises three pairs of rollers 155, 156 and 157 which, by means of drive mechanisms not shown in detail, e.g., gear systems, are driven in the directions of rotation indicated with arrows in FIG. 6. Of each pair of rollers, one roller, see FIG. 10, is supported in fixed position with respect to the frame 154 of the unit, while the upper end of the other roller may pivot relative to the frame e.g., by means of an externally spherical bearing housing 158 for that end of the roller. In this way the roller is able to oscillate or swing in a transverse, vertical plane to and from the first roller of the pair, as indicated by a horizontal arrow at the bottom of FIG. 10.

In FIG. 10, the two rollers 155 are actually shown at their minimum mutual spacing, since spring 161, the lower end of which is connected to the fixed arm 162, tends to pivot housing 159 which is supported in the spherical bearing housing 158, counterclockwise, i.e., towards the stationary roller. When a shrimp, the transverse dimension of which exceeds the spacing between the rollers, is introduced therebetween, the shrimp obviously urges the pivotal left roller 155 clockwise against the action of spring 161. Member 163 secured to housing 159 may act as a stop for the spring-urged counterclockwise pivoting of housing 159 by engaging a contact surface (not shown) on fixed arm 162. This contact surface may be in the form of a cranked horizontal leg projecting rearwardly (from the plane of FIG. 10) below arm 163. It is not intended that there should be any means for varying the minimum space between rollers 155, however, even if this may be done by permitting arm 162 to be secured to housing 154 at varying heights, such as by means of screws extending through oblong slits in the clamping flange of the arm.

By means of the above-mentioned drive mechanisms, the pairs of rollers 155, 156 and 157 are caused to rotate in the directions shown and at peripheral speeds which, by and large, are of the same order of magnitude as for the two first-mentioned pairs of rollers, while the rollers 157 rotate at a considerably higher peripheral speed. The rollers 156 may, however, have a slightly higher peripheral speed than the rollers 155. The difference in the speeds of the rollers has the effect that the forward end of a shrimp advancing between the rollers 157, moves at a considerably higher speed than its rearmost end, which is drawn forward by the rollers 156. The shrimp is therefore subjected to a strong longitudinal pull which, irrespective of the orientation of the shrimp in the head-to-tail direction, causes the shrimp to be torn apart into two parts, of which one comprises the head of the shrimp together with the previously loosened dorsal shell, while the other part comprises the shrimp meat. The processed shrimps drop off the rollers 157 on to a conveyor, not shown, or into a container, from which the shrimps proceed further to the separation of the shrimp meat from the offal, i.e., the shell and the head, which separation can take place in a manner known per se.

As indicated in FIG. 5, the rollers 157 may be supported in a separate part 154a of the frame of the unit 153 which part may be adjustable in a forward and backward direction in the conveying direction. It is thus possible to adjust the distance between the two pairs of severing or tearing rollers 156 and 157 in accordance with the size of the shrimps that are being processed in the machine.

DESCRIPTION OF THIRD EMBODIMENT

Figures 11, 12, 13:
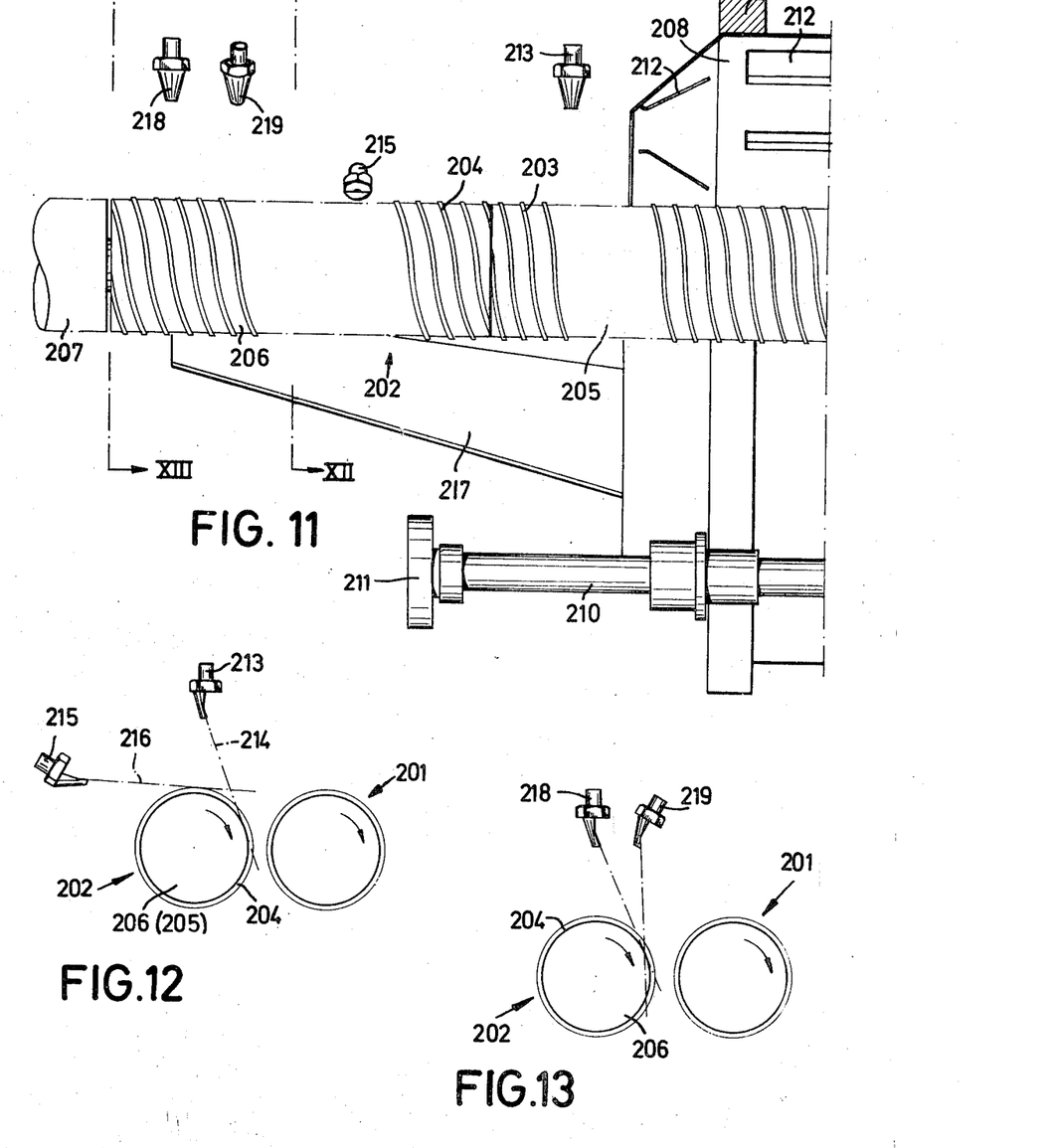
FIG. 11 is a side elevation showing a modification of the shrimp aligning or orienting portion of the machine as shown in FIGS. 5b and 6b.
FIG. 12 is a section along line XII—XII of FIG. 11.
FIG. 13 is a section along line XIII—XIII of FIG. 11.

The modified machine of which FIGS. 11-13 show the aligning or orienting means, may generally be constructed like the machine shown in more details in FIGS. 5-10. The component parts of the machine that are not seen in FIGS. 11-13, can be constructed as shown in FIGS. 5-10.

The machine thus comprises two feeding rollers generally designated by 201 and 202 which, at their ends, not shown, are pivotally supported in the frame of the machine. The two rollers are parallel and horizontal and they are spaced from each other, cf. also FIGS. 12 and 13, so as to form a feeder channel for shrimps which are supplied at the right-hand end of the machine, not shown, and are conveyed to the left by means of helical ribs 203 and 204 on the surfaces of the rollers. As described in connection with FIGS. 5-10, one roller, in this case roller 201, rotates in the same direction throughout its entire length, whereas the part of roller 202 adjacent the supply end of the machine rotates in the same direction as roller 201, and the remainder of roller 202 rotates in the opposite direction. In the Figures there are shown two sections 205 and 206 of roller 202 which are connected to each other, and the conveying ribs 204 on section 206 have a larger pitch than the ribs 203 on section 205. The subsequent roller section 207 is secured to the central drive shaft, not shown, for the roller 202 and it rotates therefore in the opposite direction of roller 201 and sections 205 and 206. The ribs, not shown, on the roller section 207 consequently possess a pitch opposite from that of the ribs 203 and 204.

In FIG. 11 there is seen, moreover, a part of the drum 208 disposed around the supply end of the rollers, which drum is rotatably supported, by means of two barrel rings 209, on two drive shafts 210 journaled in bearing housings, of which FIG. 11 shows a single housing 211. By means of carriers 212 disposed on the inside of the drum, the shrimps are lifted and subsequently drop down between the two rollers 201 and 202 which convey the shrimps to the left past the turning or alignment means shown in FIGS. 11-13 to the knives, not shown, which loosen the shells from the shrimp meat, cf. FIGS. 5-10.

The modified sidewise aligning or turning means comprises nozzles disposed along the feeder channel between the two roller sections 205 and 206. There is a first nozzle 213 disposed a short distance from the mouth of the drum 208 and this nozzle is, like the nozzles described in the following, arranged to issue a comparatively thin and wide, fan-shaped jet of water towards the surface of the roller 202. In practice, good results have been obtained by employing nozzles of the type sold under the name "Spraying System" No. 1/4 P3520 by Spraying Systems Co., 3210 Randolph Street, Belwood, Ill.

The first nozzle 213 is disposed in such a way that its jet of water, which is indicated diagrammatically in FIG. 12 by a line 214, essentially touches or is tangent to the surface of the section 205 proper, and the inclination of the nozzle may be chosen in the interval 60°-90° to the horizontal plane. Good results have been obtained with an inclination of between 65° and 70° with the horizontal.

The jet of liquid 214 exerts a downwards pressure on shrimps which pass the nozzle in the direction of advance between the two rollers, but if the shrimps have the correct alignment in the dorsal-to-ventral direction, i.e., that they already face ventral side downwards in the channel when they arrive at the nozzle 213, no change in their alignment takes place. If, on the other hand, a shrimp has its dorsal side downwards, i.e., if it is located higher up in the gap or channel between the rollers, the downwards pressure of the jet of water, in conjunction with the eccentric lifting action to which the shrimp is subjected due to the rotation of roller section 205, causes the shrimp to turn sidewise, so that, after having passed the nozzle 213, the shrimp has its ventral side downwards in the channel. In many cases, the aforesaid action exerted on the shrimp by the counterrotating roller 202 prior to the nozzle will have caused the shrimp to move forward with its longitudinal median plane inclined at an angle between the vertical and the horizontal plane.

A short distance after the nozzle 213, a second corresponding nozzle 215 is disposed, which discharges a jet of liquid 216 almost horizontally towards the upper side of roller section 206. In practice, the jet 216 may have a slight downwards inclination in the order of 4°. The jet 216, whose distance from the surface of the roller may vary slightly with the size of the shrimps (and which normally, for peeling North Sea shrimps, will lie between 4 and 6 mm.) serves to break up possible accumulations or lumps of shrimps in the feeder channel. The jet of water 216 flushes the topmost shrimps in such an accumulation away towards the opposite roller 201, from where the shrimps, in the majority of cases, will drop down into the funnel or chute 217 which leads the shrimps back to the drum 208. The nozzle 215 ensures that the shrimps, after passing the nozzle, are advanced singly between the two rollers. At the same time, the above-mentioned discontinuous increase in the pitch of the conveying ribs from section 205 to section 206, ensures that the mutual spacing of the shrimps in the feeding direction is increased.

Should there occur an accumulation of shrimps at the first nozzle 213, the nozzle will normally not be able to exert any aligning action on the lowermost shrimp in the accumulation, and consequently, a further nozzle 218 the construction and location of which corresponds entirely to nozzle 213, is disposed after the nozzle 215. As an additional safeguard ensuring that all shrimps are aligned correctly after having passed the section of the rollers shown, a fourth nozzle 219 may be disposed closely before as shown or after the third nozzle 218 and the nozzle 219 may, as shown, be disposed with its jet discharging substantially in vertical direction. The jet of water from the nozzle 219 may, like the jets from the nozzles 213 and 218, be tangent to the roller surface or, as shown, strike the roll surface a small distance from its "highest" point.

In order to further ensure the aligning of the shrimps there may be provided a further nozzle corresponding to nozzle 215 downstream of nozzle 218, and thereafter still one or two further alignment nozzles corresponding to nozzles 218 and 219. With such a doubling of the aligning nozzles, in many cases, only a single nozzle is required each time instead of the two nozzles 218 and 219 shown.

Following the described alignment of the shrimps in the dorsal-to-ventral direction, the shrimps pass on in the direction of advance past the cutting means, not shown, and the means for tearing off the head of the shrimps as described with reference to FIGS. 5–10. The shrimp meat thus obtained will, in the majority of cases, be free of shells, but a certain supplementary peeling or cleaning of the shrimps may be necessary, e.g., if a shell has been partly crushed during the peeling, so that fragments of the shell adhere to the meat. It has been found that this supplementary peeling can be carried out with good results and with a minimum of deleterious effect on the quality of the shrimp meat in a machine which, in principle, can be constructed like the known machines referred to above, having sloping, oscillating rollers which, in combination, form a squeezing crotch or gap. In contrast to known machines of this kind which are used for the complete peeling of shrimps, in a supplementary peeler for use in conjunction with the machine according to the present invention, a peeler will be used, the rollers of which have smooth and hard surfaces, for instance polished steel rollers. The rollers are, moreover, not disposed in close contact with each other, but with an intermediary gap of the same order of magnitude as the double thickness of a shrimp shell. When shrimps peeled in the machine according to the present invention are supplied to the upper end of the supplementary peeler, they move during the oscillation of the rollers downwards towards the discharge end, whereby any adhering shells or fragments of shells are loosened from the shrimp meat due to the squeezing action of the cooperating rollers. The smooth roller surfaces, on the other hand, do not act upon the shrimp meat itself, the surface of which is smooth and the meat is therefore not exposed to any significant quality damage during the supplementary peeling.

With the embodiments described it is possible to process boiled shrimps such short time after the boiling that no significant decomposition of the connective tissue between the shell and the shrimp meat has taken place. It has proved possible to obtain a considerably increased yield of shrimp meat as compared to earlier methods, in which the shrimps had to be stored for such a long time that a significant transformation of the connective tissue between the shell and the meat had taken place. This storing was necessary due to the use of a peeling method involving oscillating rollers, which had as a necessary prerequisite that a significant reduction in adhesion of the shell to the shrimp meat had been obtained before peeling the shrimps. The storing also entailed a certain deterioration of the meat, so that considerable portions of edible meat remained on the shells and thereby went to waste. The peeling method had the further effect that the shrimps got a rather frayed surface which, in itself, encouraged an undesirable leaching of flavor and color through the action of the water used in the peeling process. Even if in the machine according to the invention more jets of water than those shown may be used in order to maintain a film of water on the surface of the conveying rollers, this entails a considerably less significant deterioration in the quality of the shrimps than with the known machines. When using the machine according to the invention, it is expedient to boil the shrimps after the expiration of a predetermined period from the time of catching and, if desired, keep the shrimps chilled prior to peeling them.

It is not necessary that the tail shell is removed immediately after the loosening of the dorsal shell. This operation may be postponed until after the separation of the head. It is observed in this connection that the two grooves 164 shown in FIGS. 5 and 6, which interrupt the conveying ribs in the surfaces of the rollers, facilitate the gripping of the tail shell by means of the two drawing rollers 150. Above the two grooves 164, nozzles 165 may be disposed to emit downward jets of water 166 in vertical planes towards the feeder channel. By means of such jets the tail of the shrimp is forced down into one or the other set of grooves. It will be understood that the proper distance between the conveying rollers 101 and 102 depends upon the size of the shrimps and that it is expedient to make the distance adjustable, so as to be able to process shrimps of various sizes in the same machine. The conveying rollers 101, 102 could be disposed with a downward inclination, like in the machine shown in FIGS. 1–4, so that the weight of the shrimps assists in conveying them through the machine. However, even in such a case it will be expedient to provide the surface of the rollers with the helical ribs shown which also ensure that the antennae of the shrimps do not adhere to the roller surfaces whereby the shrimps might be lifted up from the feeder channel and thrown out of the machine.

What I claim is:

1. A machine for peeling shrimps, comprising a first roller and a second roller, means for rotatably supporting said first and second rollers in parallel relationship to form therebetween a shrimp-feeding channel having an inlet end and an outlet end, means for continuously rotating said first and second rollers in opposite directions so that in said channel the roller surfaces move upwards against shrimps advancing in said channel, aligning means located upstream of said channel inlet end and arranged for orientating shrimps sidewise so that shrimps are discharged from said aligning means into said channel with their ventral side facing downwards in said channel, means for supplying shrimps to said aligning means, radially projecting cutting means secured to each roller at said channel outlet end, means located above said cutting means for engaging the dorsal side of a shrimp to press said shrimp down into said channel, and means located downstream of said outlet end for tearing the head of a shrimp from the body portion thereof.

2. A machine as claimed in claim 1 wherein said aligning means comprises a pair of turning rolls, means for supporting each of said rolls coaxially with one of said rollers and means for driving said turning rolls in synchronous oscillating movements independently of the rotation of said rollers.

3. A machine as claimed in claim 2 in which at least the surface of said turning rolls is made of rubberlike material, and further comprising means for applying a spray of water to one of said turning rolls.

4. A machine as claimed in claim 1 comprising a helically extending feeding rib projecting from the surface of each of said rollers, said rib having a larger pitch in the region of said aligning means than upstream of said means.

5. A machine as claimed in claim 1 further comprising aligning means for endwise orientation of shrimps advancing in said feeding channel.

6. A machine as claimed in claim 5 wherein said endwise orienting means comprises a V-shaped member pivotally supported on a horizontal axis above an transverse to said feeding channel, the apex of said member being located between the roller surfaces in said groove.

7. A machine as claimed in claim 6, wherein said V-shaped member is bent from a piece of wire and provided with an enlargement in the apex thereof.

8. A machine as claimed in claim 5, wherein endwise orienting means are located both upstream and downstream of said sidewise orienting means.

9. A machine as claimed in claim 1, wherein said head-tearing means comprises a first disc, means for rotatably supporting said disc on a substantially horizontal axis perpendicular to said roller axes, two further discs having a larger diameter than said first disc and each supported on one side thereof and coaxially therewith, and means for rotating said first disc and said further discs in opposite directions on said common axis.

10. A machine as claimed in claim 9 comprising at least one spike secured to and projecting radially from the periphery of said first disc.

11. A machine as claimed in claim 9 comprising means for axially adjusting each of said further discs with respect to said first disc.

12. A machine as claimed in claim 9 wherein said dorsal-engaging means comprises a frame, means for pivotally supporting said frame on a substantially horizontal axis spaced from the outlet end of said feeding channel, first and second pulleys rotatably supported in said frame, a belt trained over said pulleys and having a lower strand between said pulleys which normally extends substantially parallel to said feeding channel, and drive means for rotating said first pulley.

13. A machine as claimed in claim 12 comprising means for continuous adjustment of the rotational speed of said first pulley.

14. A machine as claimed in claim 9 comprising means for adjusting the distance from the outlet end of said feeding channel to the axis of said rotary discs.

15. A machine as claimed in claim 1, wherein said head-tearing means comprises two pairs of rollers, means for rotatably supporting said rollers with substantially vertical axes located in planes perpendicular to the longitudinal direction of said feeding channel and spaced from each other in said longitudinal direction, means for resiliently biasing the rollers of each pair towards one another, and means for synchronously rotating said roller pairs in opposite directions and with peripheral speeds, the peripheral speed of the rollers remote from the outlet end of said feeding channel being larger than the speed of the other pair of rollers.

16. A machine as claimed in claim 15 comprising means for varying the spacing between said pairs of rollers.

17. A machine as claimed in claim 15 further comprising a pair of guide rollers rotatably supported on vertical axes between said channel and said first pair of tearing rollers, means for resiliently biasing said guide rollers towards one another to a minimum distance approximately equal to the thickness of a shrimp, and means for synchronously rotating said guide rollers in opposite directions at a peripheral speed substantially equal to that of the first pair of tearing rollers.

18. A machine as claimed in claim 15, wherein said dorsal-engaging means comprises a disc, means for rotatably supporting said disc on a horizontal axis located above said head-tearing means and perpendicular to said feeding channel, and means for rotating said disc about said axis.

19. A machine as claimed in claim 18 comprising spikes secured to and radially projecting from the peripheral surface of said disc.

20. A machine as claimed in claim 19 wherein the projecting parts of said spikes are tapered and rounded at their ends.

21. A machine as claimed in claim 1, wherein said cutting means comprises a plurality of pins secured in and radially projecting from the periphery of each of said feeding rollers, the projecting ends of said pins being flat ground.

22. A machine as claimed in claim 1 further comprising a pair of rollers for pulling the tail shell of a shrimp downwardly through said feeding channel, means for supporting said tail-shell-pulling rollers below and substantially parallel to said first and second rollers and means for rotating said tail-shell-pulling rollers in opposite directions.

23. A machine as claimed in claim 22 in which at least one peripheral groove is provided in the surface of each feeding roller downstream of said knife means.

24. A machine as claimed in claim 1 wherein said shrimp-aligning means and said means for feeding shrimps to the aligning means comprise a third roller rotatably supported in coaxial extension of said first roller, means for continuously rotating said third roller in the same direction as said second roller, a fourth roller secured to said second roller in coaxial extension thereof and parallel with said third roller to form therewith an upstream extension of said feeding channel, and means located adjacent said third and fourth rollers for pressing a shrimp advancing past said pressing means down into said channel extension.

25. A machine as claimed in claim 24 wherein said pressing means comprises a stationary bar having a helical longitudinal edge facing against said channel.

26. A machine as claimed in claim 24 wherein said pressing means comprises at least a first nozzle located so as to deliver a water jet in the direction substantially tangential to the surface of said third roller.

27. A machine as claimed in claim 26 wherein said nozzle is mounted at an angle such that said water jet issues at an angle of between 60° and 90° with the plane containing the two parallel roller axes and inwardly towards said feeding channel extension.

28. A machine as claimed in claim 26 further comprising a second nozzle located downstream of said first nozzle and mounted so as to deliver a water jet in a direction slightly inclined with respect to the plane containing the roller axes and tangentially inwards against the upper surface of said third roller, and a third nozzle located downstream of said second nozzle and substantially identical in structure and location with said first nozzle.

29. A machine as claimed in claim 28 wherein the water jet issuing from said second nozzle forms an angle of 3°–5° with said plane.

30. A machine as claimed in claim 28 further comprising a fourth nozzle located adjacent said third nozzle and mounted so as to deliver a water jet downwardly towards said feeding channel extension substantially tangential to the surface of said third roller.

31. A machine as claimed in claim 30 wherein the water jet from said fourth nozzle forms an angle of 85°–87° with the plane containing the roller axes.

32. A machine as claimed in claim 26 comprising a helically extending feeding rib projecting from the surface of each of said rollers, the pitch of said rib increasing in a stepwise transition in the region of said first nozzle.

* * * * *